United States Patent [19]
Tsumura

[11] 4,305,077
[45] Dec. 8, 1981

[54] SYSTEM FOR MEASURING CURRENT POSITION AND/OR MOVING DIRECTION OF VEHICLE

[76] Inventor: Toshihiro Tsumura, 3-41, Abiko-cho, Sumiyoshi-ku, Osaka-shi, Japan

[21] Appl. No.: 102,628

[22] Filed: Dec. 11, 1979

[30] Foreign Application Priority Data

May 30, 1979 [JP] Japan .................................. 54-67004

[51] Int. Cl.³ .............................................. G01S 3/02
[52] U.S. Cl. .............................. 343/112 R; 343/112 C
[58] Field of Search ....................... 343/112 R, 112 C

[56] References Cited
U.S. PATENT DOCUMENTS
3,430,243  2/1969  Evans ............................ 343/112 R

*Primary Examiner*—Theodore M. Blum
*Attorney, Agent, or Firm*—Darby & Darby

[57] ABSTRACT

A reference station is provided at a fixed position. The station is adapted to transmit a scanning signal the transmitting direction of which is scanned in succession in different directions, a positional information signal representative of the position of the reference station and an azimuth information signal representative of a particular azimuth. A vehicle moving with respect to the reference station is provided with receivers at three positions spaced apart from each other by given distances, so that when the vehicle moves in the service area of the reference station the signals transmitted by the reference station are received. The current position of the vehicle and the moving direction of the vehicle are operated based on a time or phase difference from receipt of the particular azimuth signal until receipt of the scanning signal by the three receivers, the position of the reference station and the distances between the three receivers provided in the vehicle.

22 Claims, 19 Drawing Figures

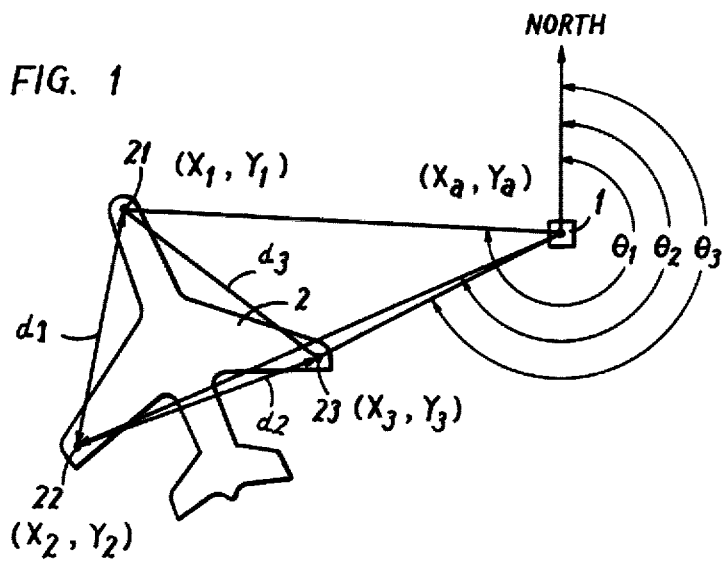
FIG. 1
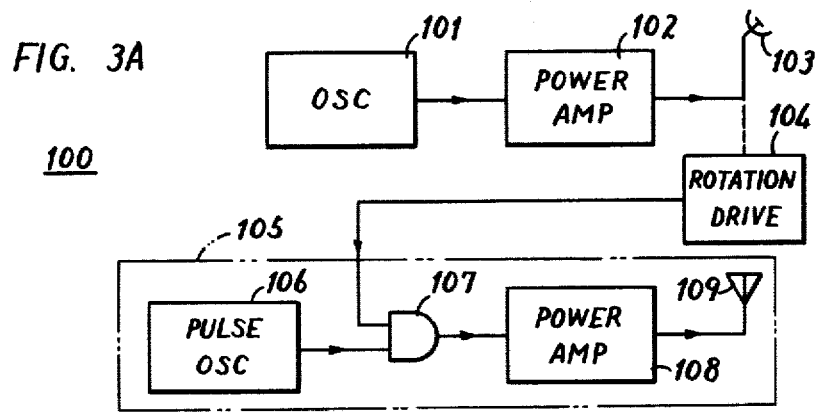
FIG. 3A
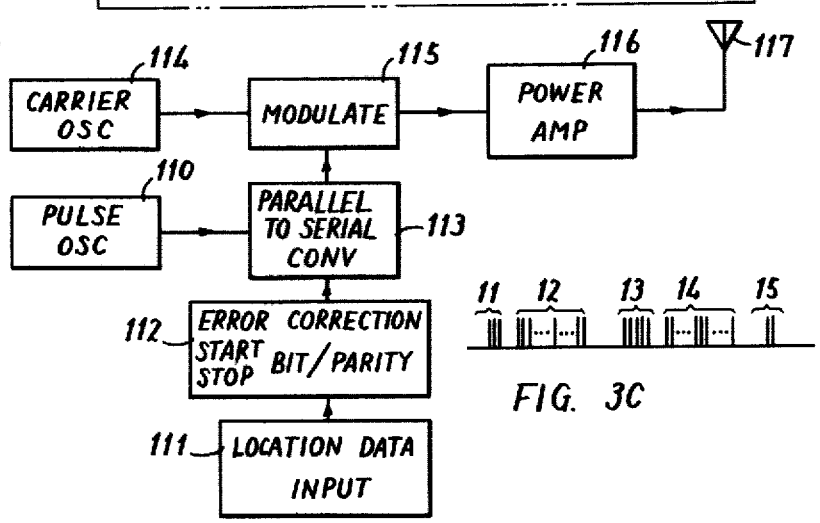
FIG. 3B
FIG. 3C

SYSTEM FOR MEASURING CURRENT POSITION AND/OR MOVING DIRECTION OF VEHICLE

BACKGROUND OF THE INVENTION

1. Field of the Invention

The present invention relates to a system for measuring the current position and/or the moving direction of a moving vehicle. More specifically, the present invention relates to a system for automatically measuring the current position and the moving direction in association with the movement of a vehicle such as an automobile, aircraft, ship and the like which moves along a given moving path.

2. Description of the Prior Art

For the purpose of measuring the current position and the moving direction of a moving vehicle with simplicity, various systems using an electric wave such as LORAN, Decca, OMEGA and the like have heretofore been proposed and put in practical use. Nevertheless, such proposed systems require a plurality of, and at least three, reference stations installed at different locations spaced far from each other. Thus, no system has been proposed which can detect the position and measure the moving direction of a moving vehicle based on only a reference station installed at a single location.

SUMMARY OF THE INVENTION

The present invention comprises a novel system for measuring the current position and/or the moving direction of a moving vehicle based on the data obtained from a reference station provided at a predetermined location. The reference station is structured to transmit an azimuth scanning signal the direction of which is scanned in succession in different directions, a location information signal representative of the location of the reference station, and an azimuth associated information signal representative of a predetermined azimuth. At least the azimuth scanning signal is received at three different positions spaced apart by predetermined distances, and the location information signal and the azimuth associated information signal are received at at least one of the said positions. At least one receiver means and information processing means are borne on the moving vehicle. The information processing means is structured to make an arithmetic operation based on the differences between the time points when the azimuth scanning signal is received by the said three positions, the location of the reference station, and the distances between the said three positions, and in accordance with a predetermined operation formula, thereby to evaluate the current position and/or the moving direction of the moving vehicle.

According to the present invention, the current position and/or the moving direction of a moving vehicle can be evaluated with accuracy in accordance with the movement of the vehicle, so that the same can be advantageously used in operation of the vehicle.

According to a preferred embodiment of the present invention, information processing means may be implemented by a microcomputer, wherein a control program of the microcomputer is stored in a read-only memory. The read-only memory is also loaded with a prescribed operation formula. Angles between the three receiving positions with respect to the location of the reference station are evaluated, and these angles, the location of the reference station and the distances between the said three positions are applied to the prescribed operation formula as read from the read-only memory, whereby the absolute locations of the said three positions are evaluated. The moving direction of the vehicle is evaluated based on the absolute locations of these three positions.

According to a further preferred embodiment of the present invention, the angle of the vehicle with respect to the reference station is evaluated based on the angles of the said three positions with respect to the location of the reference station and a straight line distance from the vehicle to the reference station is evaluated based on the location corresponding to the maximum angle among the said angles and the location corresponding to the minimum angle among the said angles among the said three locations, whereupon the current position is evaluated based on the angle of the vehicle with respect to the fixed location and the straight line distance.

Accordingly, a principal object of the present invention is to provide a novel system for measuring the current position and/or the moving direction of a moving vehicle in association with the movement thereof.

Another object of the present invention is to provide a novel system which is capable of measuring the current position and/or the moving direction of a moving vehicle with accuracy.

A further object of the present invention is to provide a novel system which is capable of measuring the current position and/or the moving direction of a moving vehicle using a relatively simple structure including a microcomputer.

Still a further object of the present invention is to provide a novel system which is capable of providing a visual indication of the current position and/or the moving direction of a moving vehicle.

These objects and other objects, features, aspects and advantages of the present invention will become more apparent from the following detailed description when taken in conjunction with the accompanying drawings.

BRIEF DESCRIPTION OF THE DRAWINGS

FIG. 1 is a diagrammatic view for explanation of the principle of the present invention;

FIGS. 3A and 3B are block diagrams showing one example of a transmitter provided in a reference station;

FIG. 3C is a graph showing wave forms of the location information signal representative of the location of the reference station;

DESCRIPTION OF THE PREFERRED EMBODIMENTS

Figure 2:
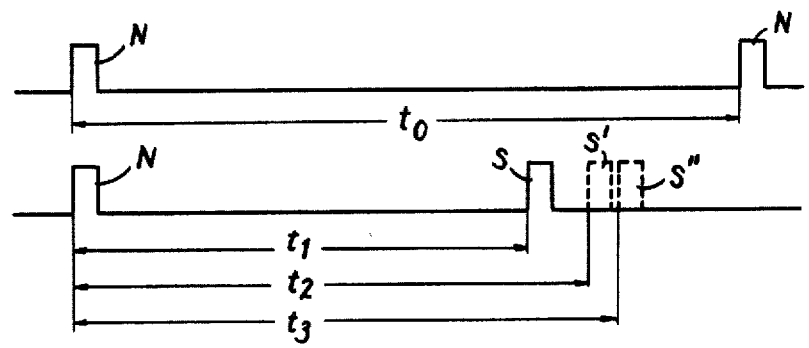
FIG. 2 is a graph showing wave forms of the azimuth associated information signal and the azimuth scanning signal.

FIG. 1 is a diagrammatic view for explanation of one principle of the present invention. According to the present invention, a reference station 1 is installed in a predetermined location. Assuming that a moving vehicle is an aircraft 2, then the reference station 1 is installed in a predetermined location (Xa, Ya) in the vicinity of a guided path, for example. As to be more fully described subsequently with reference to FIGS. 3A and 3B, the reference station 1 is provided with a transmitter for transmitting an azimuth scanning signal which comprises a directional continual wave which is scanned in succession in all the different azimuthal directions starting from a predetermined azimuth, say the north. Such azimuth scanning signal can be transmitted by sequentially rotating a transmitting antenna having an extremely sharp directivity. The reference station 1 is further provided with a transmitter for transmitting an azimuth associated information signal representative of the said specified azimuth such as the north at the timing when the direction of transmission of the azimuth scanning signal is brought to the said prescribed azimuth such as the north. The reference station 1 is further provided with a transmitter for transmitting a location information signal representative of the location (Xa, Ya) of the reference station 1. The two latter mentioned transmitters for transmitting the azimuth associated information signal and the location information signal are structured to transmit these signals with non-directivity.

On the other hand, an aircraft 2 taken by way of an example of a moving vehicle is provided with three receivers, not shown in FIG. 1 and depicted subsequently with reference to FIGS. 4 and 5, which are provided at a first position 21 at the front end of the aircraft 2, a second position 22 at the left main wing of the aircraft 2 spaced apart from the first position 21 by a predetermined distance d1, and a third position 23 at the right main wing of the aircraft 2 spaced apart from the second location 22 by a predetermined distance d2 and spaced apart from the first location 21 by a predetermined distance d3 for receiving the azimuth scanning signal, the azimuth associated information signal and the location information signal, respectively. The receivers, not shown in FIG. 1, provided at the positions 21, 22 and 23 are enabled to receive, with non-directivity, the above described three signals, if and when the aircraft 2 moves in the service area of the reference station 1.

FIG. 2 is a graph showing wave forms of the azimuth associated information signal and the azimuth scanning signal. Now referring to FIGS. 1 and 2, one principle of the present invention will be described. If and when the reference station 1 transmits the azimuth associated information signal N representative of the prescribed azimuth, say the north at the timing shown in FIG. 2, then the receivers, not shown, borne at the three positions 21, 22 and 23 on the aircraft 2 moving in the service area of the reference station 1 at that timing receive the above described azimuth associated information signal N. Thus it follows that the reference station 1 transmits the azimuth scanning signal, with the very sharp directivity, in the specified azimuth say the north just at the very timing when the azimuth associated information signal N is transmitted. Thereafter the scanning signal is transmitted with the very sharp directivity in the directions being changed in succession from the north azimuth. Then, referring to FIG. 1, the receiver at the position 23 of the aircraft 2 first receives the azimuth scanning signal and then the receiver at the position 22 of the aircraft 2 receives the azimuth scanning signal and finally the receiver at the position 21 of the aircraft receives the azimuth scanning signal. More specifically, considering the position 21, the receiver provided at the position 21 first receives the prescribed azimuth associated information signal N and after a delay of the time period t1 the same receives the azimuth scanning signal S. On the other hand, the receiver at the position 22 first receives the azimuth associated information signal N and then receives the azimuth scanning signal S' with a delay of the time period t2. Further, the receiver at the position 21 receives the azimuth scanning signal S" with a delay of the time period t3.

On the other hand, as to be more fully subsequently, a microcomputer is borne on the aircraft 2 for the purpose of the arithmetic operation to be described subsequently. The data concerning the time periods t1, t2 and t3 is applied to the microcomputer. The microcomputer is programmed to read out from a read-only memory, not shown, the gradients a1, a2 and a3 of the straight lines lying between the respective positions 21, 22 and 23 and the location of the reference station 1, with the azimuth of the north as a reference, based on the above described time data. More specifically, the angles $\theta 1$, $\theta 2$, and $\theta 3$ of the respective positions with respect to the specified azimuth, say the north, of the reference station 1 are evaluated based on the above described time periods t1, t2 and t3. Various such angles with respect to various time periods are to be in advance loaded as a table in a read-only memory, not shown, so that the corresponding angles may be read out as a function of such time periods by reference to such a table. The gradients a1, a2 and a3 of the straight lines connecting the respective positions 21, 22 and 23 and the reference station 1 are then evaluated based on the above described angles $\theta 1$, $\theta 2$ and $\theta 3$. More specifically, such gradients a1, a2 and a3 are evaluated by the following equations (1), (2), and (3), respectively:

$$a1 = \tan \theta 1 \tag{1}$$

$$a2 = \tan \theta 2 \tag{2}$$

$$a3 = \tan \theta 3 \tag{3}$$

Thus, the gradients of the straight lines connecting the respective positions 21, 22 and 23 and the reference station 1 can be evaluated. Alternatively of obtaining the gradients by an arithmetic operation of the above described three equations, such a relation between various angles and the corresponding gradients may be prepared in advance as a table and stored in a read-only memory.

Then formulas representing the straight lines connecting the respective positions 21, 22 and 23 and the reference station 1 are evaluated based on the location (Xa, Ya) where the reference station 1 is installed. More specifically, the formula of the straight line connecting the position 21 and the location of the reference station 1 may be expressed by the following equation (4).

$$Y1 - Ya = a1(X1 - Xa) \qquad (4)$$

It can be determined that the position 21 of the aircraft 2 is on the straight line defined by the equation (4). Similarly, the formula representing the straight line connecting the position 22 and the reference station 1 may be expressed by the following equation (5).

$$Y2 - Ya = a2(X2 - Xa) \qquad (5)$$

Now it can be determined that the position 22 of the aircraft 2 is on the straight line defined by the equation (5). Similarly, the formula representing the straight line connecting the position 23 of the aircraft 2 and the location of the reference station 1 may be expressed by the following equation (6).

$$Y3 - Ya = a3(X3 - Xa) \qquad (6)$$

Thus, it can be determined that the position 23 of the aircraft 2 is on the straight line defined by the equation (6).

The distances d1, d2 and d3 between the respective positions 21, 22 and 23 on the aircraft 2 may be expressed by the following equations (7), (8) and (9).

$$d1 = \sqrt{(X1 - X2)^2 + (Y1 - Y2)^2} \qquad (7)$$

$$d2 = \sqrt{(X2 - X3)^2 + (Y2 - Y3)^2} \qquad (8)$$

$$d3 = \sqrt{(X1 - X3)^2 + (Y1 - Y3)^2} \qquad (9)$$

Furthermore, the formulas representing the straight lines connecting the respective positions 21, 22 and 23 may be expressed by the following equations (10), (11) and (12).

$$Y1 - Y2 = b1(X1 - X2) \qquad (10)$$

$$Y2 - Y3 = b2(X2 - X3) \qquad (11)$$

$$Y1 - Y3 = b3(X1 - X3) \qquad (12)$$

Therefore, the constants b1, b2 and b3 representing the gradients of the respective straight lines may be expressed by the following equations (13), (14) and (15).

$$b1 = (Y1 - Y2)/X1 - X2 \qquad (13)$$

$$b2 = (Y2 - Y3)/X2 - X3 \qquad (14)$$

$$b3 = (Y1 - Y3)/X1 - X3 \qquad (15)$$

In the above described equations, the quantities Xa, Ya, a1, a2, a3, d1, d2 and d3 are known while the quantities X1, Y1, X2, Y2, X3, and Y3 are unknown; however, these unknown quantities X1, Y1, X2, Y2, X3, Y3 can be evaluated by solving the above described simultanuous equations (1) to (15). An arithmetic operation for solving such simultanuous equations can be advantageously performed by using a microcomputer, for example. By evaluating the positional data (X1, Y1), (X2, Y2), and (X3, Y3) of the positions 21, 22, and 23 of the aircraft 2, the current position and the moving direction of the aircraft 2 can be simply determined. More specifically, the current position of the aircraft 2 per se can be considered as represented by the data (X1, Y1) of the position 21. On the other hand, the moving direction of the aircraft can be obtained by dividing the distance d2 by two, and by obtaining the formula of the straight line connecting the said two-divided point and the position 21, wherein the direction of the thus obtained straight line can be considered as the moving direction or azimuth of the aircraft 2.

Now referring to FIGS. 3A and 3B, a transmitting equipment 100 installed in the reference station 1 will be described. FIG. 3A is a block diagram of a transmitter portion for transmitting the azimuth scanning signal and the azimuth associated information signal including the information representative of a specified azimuth when the azimuth scanning signal is directed to a specified azimuth say the north, while FIG. 3B is a block diagram showing a transmitter portion for transmitting the location information signal representative of the location (Xa, Ya) of the reference station 1.

Referring to FIG. 3A, an oscillator 101 is provided to generate a continual oscillation signal serving as the above described azimuth scanning signal. The oscillation output of the oscillator 101 is amplified by a power amplifier 102 and is led to an antenna 103. The antenna 103 is implemented by a parabola antenna, for example, having a very sharp unidirectional directivity. Such an antenna having a unidirectional directivity is well-known to those skilled in the art. The unidirectional directivity antenna 103 is rotated by means of a rotation driving means 104, whereby the direction of the unidirectivity is charged in succession and thus the azimuth or direction is scanned in succession in all the different directions. The rotation driving means 104 may comprise a motor for such driving, although not shown. The rotation driving means 104 is provided with a switch or a similar means for generating a timing signal at the timing when the direction of the unidirectivity of the antenna 103 is directed to a specified azimuth say the north. Thus, a timing signal is generated from the rotation driving means 104 if and when the direction of the unidirectivity of the antenna 103 is directed to the azimuth of the north and is applied to an AND gate 107 included in an azimuth signal circuit 105. The other input of the AND gate 107 is connected to receive the output of a pulse oscillator 106. Accordingly, the AND gate 107 provides an output of one or more pulses, if and when the antenna 103 for transmitting the azimuth scanning signal is brought to the specified azimuth such as the north. The pulses obtained from the AND gate 107 are applied through a power amplifier 108 to an antenna 109. The antenna 109 may be implemented by a dipole antenna, for example of a non-directivity characteristic. Accordingly, the transmitter portion shown in FIG. 3A serves to transmit through the antenna 103 the azimuth scanning signal the transmitting directivity of which is in succession changeable and to transmit through the antenna 109 the azimuth associated information signal in the form of a pulse representing when the azimuth scanning signal is directed to the specified azimuth such as the north.

Referring to FIG. 3B, a pulse oscillator 110 is provided for normally generating a microwave pulse, for example, and the output of the pulse oscillator 110 is applied to a parallel/serial converter 113. On the other hand, the parallel/serial converter 113 is supplied with the output from an error correcting and bit adding circuit 112. The error correcting and bit adding circuit 112 is connected to receive a coded signal from a location data input circuit 111. The location data input circuit 111 may comprise a key board including numeral keys and function keys, for example. Meanwhile, although the location data input circuit 111 may be incorporated in the transmitter, preferably the location data input circuit 111 may be provided detachably to the transmitter and only if and when the transmitter is installed in the reference station 1 the circuit 111 may be provisionally provided for providing such location data, in consideration of economy in manufacture of a number of transmitters. The input circuit 111 is used to input the location information (Xa, Ya) of the reference station 1, which is applied to the circuit 112 as the coded information. The circuit 112 makes error correction to the applied coded data and adds a start bit, a stop bit and/or a parity bit. The coded data thus processed is then applied to the parallel/serial converter 113 in a parallel fashion. Meanwhile, it is pointed out that the circuit 112 is not necessarily required and hence may be omitted as desired. The parallel/serial converter 113 serves to convert the coded signal inputted in parallel into a serial coded signal in succession responsive to the pulses obtained from the pulse oscillator 110, which serial coded signal is then applied to a modulation circuit 115. The modulation circuit 115 serves to modulate the carrier output obtained from a carrier oscillator 114 as a function of the output of the circuit 113, i.e. a code signal of the data of the location (Xa, Ya). The modulated signal obtained from the modulation circuit 115 is applied through a power amplifier 116 to an antenna 117. The antenna 117 may be of a non-directivity antenna, as in case of the above described antenna 109. Thus the antenna 117 serves to transmit with non-directivity characteristic the signal as shown in FIG. 2C.

Referring to FIG. 2C, the signal 11 serves to indicate that the same is followed by the signal 12 which represents X, say the latitude data in terms of the specific numerical information. On the other hand, the signal 13 serves to indicate that the same is followed by the signal 14 which represents the data Y which is the longitude data in terms of a specific numerical value. The final signal 15 represents the termination of the data. These signals 11 to 15 constitute one cycle and are repeated.

Figure 4:
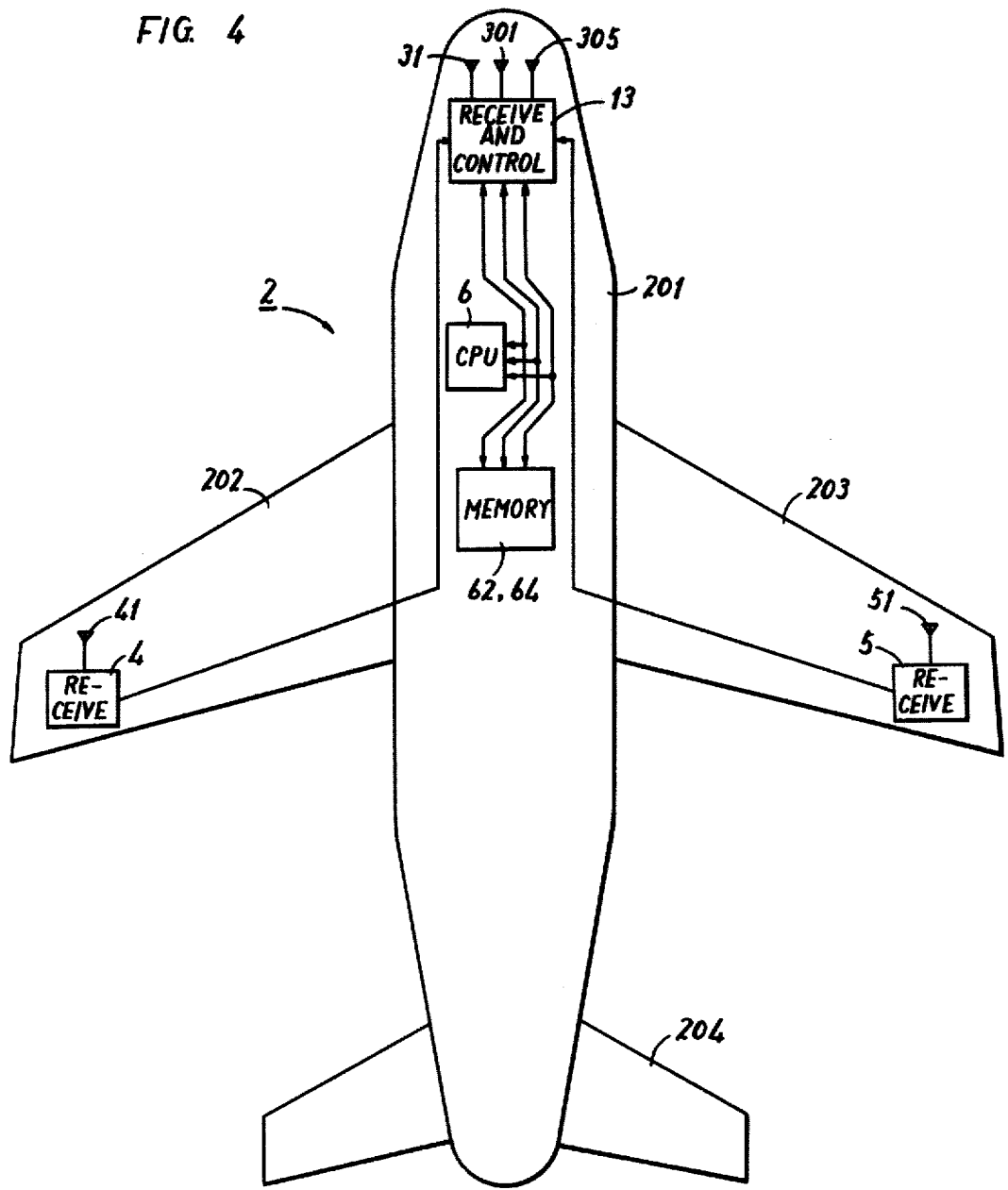
FIG. 4 is a diagrammatic view showing an arrangement in an aircraft taken by way of an example of a moving vehicle for use in the present invention.
Figure 5:
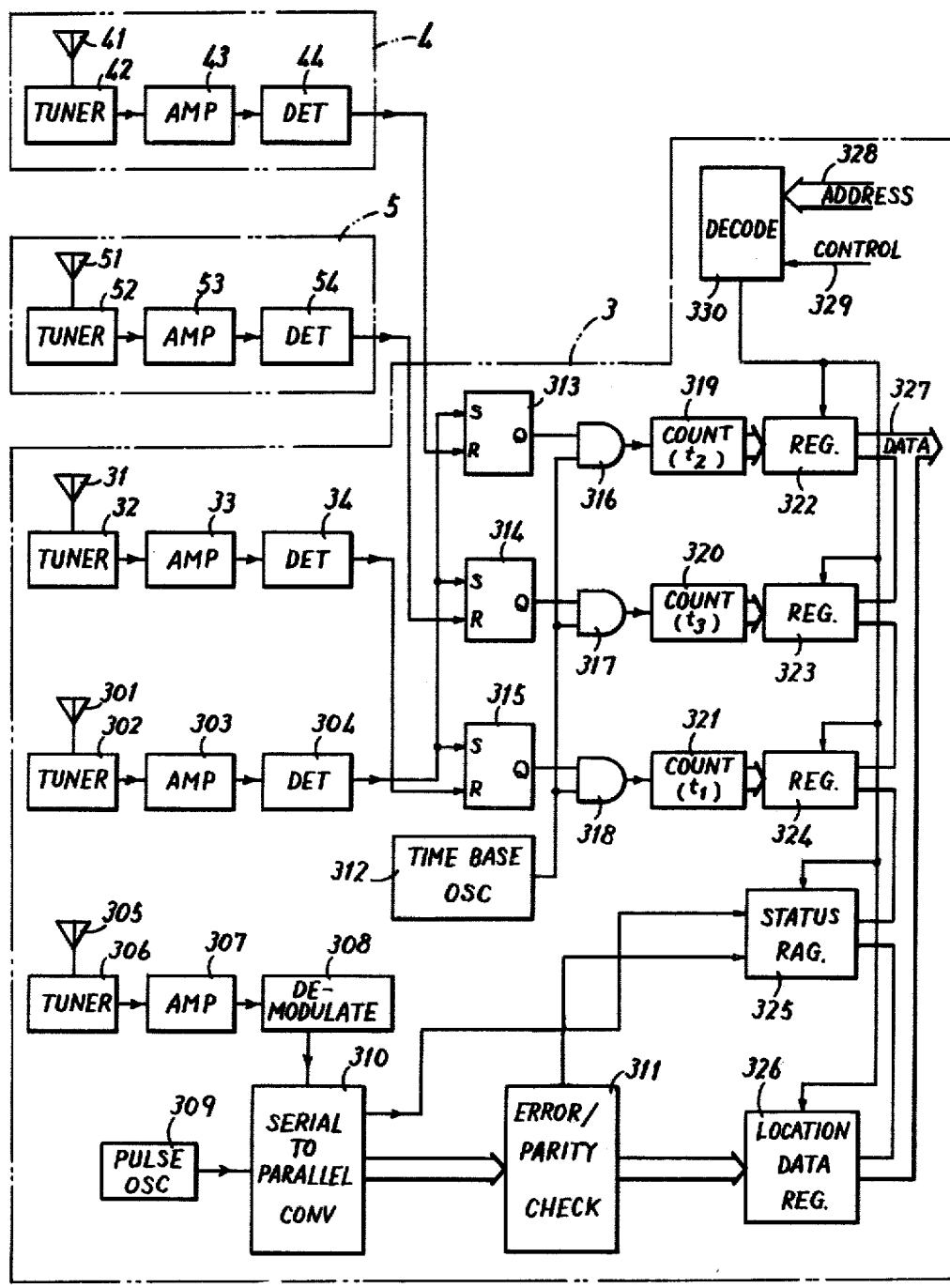
FIG. 5 is a block diagram showing one example of a receiver borne on the FIG. 4 aircraft.

FIG. 4 is a diagrammatic view showing an arrangement in an aircraft by way of an example of a moving vehicle. Typically the aircraft 2 comprises a body 201, a left wing 202, a right wing 203 and a tail wing 204. A receiving and control unit 3 is provided at a given position, say the position 21 in FIG. 1, at the front end of the body 201. A receiver 4 is provided at a given position, corresponding to the position 22 in FIG. 1, of the left wing 202 of the aircraft 2. A receiver 5 is provided at a given position, corresponding to the position 23 in FIG. 1, of the right wing 203 of the aircraft 2. Furthermore, a central processing unit 6 such as a microcomputer and memories 62 and 64 operatively coupled thereto are provided in association with the receiving and control unit 3 in the aircraft 2.

Figure 6:
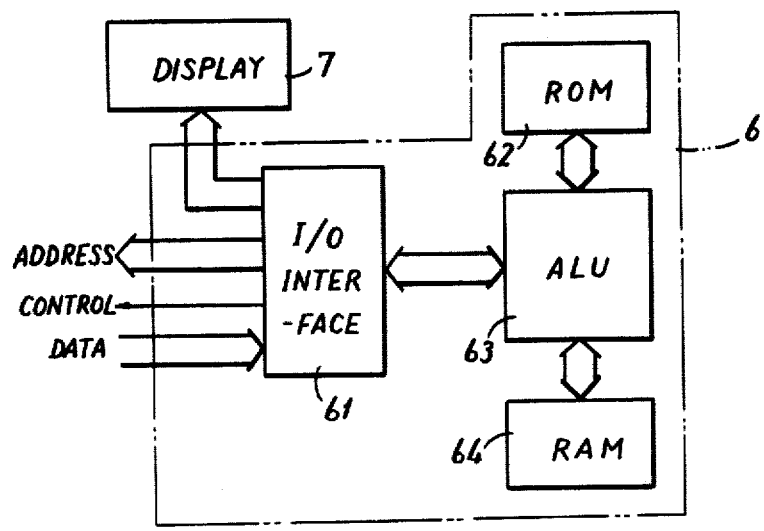
FIG. 6 is a block diagram showing one example of a microcomputer used as a central processing unit.

As shown in FIG. 6, the microcomputer 6 comprises an input/output interface circuit 61, a read-only memory 62, an arithmetic unit 63, a random access memory 64 and the like and is operated in accordance with the operation program stored in the read-only memory 62. The read-only memory 62 is also allotted to store a table of the angles $\theta_1$, $\theta_2$ and $\theta_3$ with respect to the time periods t1, t2 and t3 after receipt of the azimuth associated information signal N representing the specified azimuth until receipt of the azimuth scanning signal at the respective positions, a table representing the relation of the gradients a1, a2 and a3 with respect to the angle $\theta$, and the like. The central processing unit 6 receives the data through a data bus 327 from the receiving and control unit 3 shown in FIG. 5 and provides the operation results to a display 7, where the operation results are displayed.

Now referring to FIG. 5, the receiving and control unit 3, and the receivers 4 and 5 shown in FIG. 4 will be described in more detail. Referring to the receiver 4 provided on the left wing 202 of the aircraft 2, an electric signal received by an antenna 41 is applied through a tuner circuit 42 and an amplifier 43 to a detecting circuit 44. Similarly the receiver 5 provided on the right wing 203 of the aircraft 2 comprises an antenna 51, a tuner circuit 52, an amplifier 53 and a detecting circuit 54. The receiving and control unit 3 provided at the front end of the body 201 of the aircraft 2 also comprises an antenna 31, a tuner circuit 32, an amplifier 33 and a detecting circuit 34. These receivers 4 and 5 and the receiver portion including the components 31, 32, 33 and 34 of the unit 3 serve to receive the azimuth scanning signal transmitted from the transmitter 100 (FIGS. 3A and 3B) provided in the reference station 1.

The receiving and control unit 3 further comprises an antenna 301, a tuner circuit 302, an amplifier 303 and a detecting circuit 304 for receiving the azimuth associated information signal N. The unit 3 further comprises an antenna 305, a tuner circuit 306, an amplifier 307 and a demodulating circuit 308 for receiving the location information signal transmitted from the reference station 1. The location information as demodulated by the demodulating circuit 308 is applied to a serial/parallel converter 310. The serial/parallel converter 310 serves to convert the received serial data into a parallel signal as a function of the pulse from the pulse oscillator 309 and the converted parallel signal is applied to an error/parity check circuit 311.

The azimuth scanning signal as received by the receiver 4 is applied to the reset input R of a flip-flop 313 included in the unit 3. Similarly, the azimuth scanning signal received by the receiver 5 is applied to the reset input R of a flip-flop 314. The output of the detecting circuit 34 included in the unit 3, i.e. the scanning signal received by the unit 3 is applied to the reset input R of a flip-flop 315. The set inputs of these flip-flops 313, 314 and 315 are connected to receive the signal obtained form the detecting circuit 304 included in the unit 3, i.e. the azimuth associated information signal. Accordingly, these flip-flops 313, 314 and 315 are set upon receipt of the azimuth associated information signal N by the receiving and control unit 3 and are reset upon receipt of the azimuth scanning signal by the corresponding receiver portions. Accordingly, the outputs Q of these flip-flops 313, 314 and 315 remain the high level after receipt of the azimuth associated information signal N until receipt of the azimuth scanning signal by the respective receiver portions. The output Q of the flip-flop 313 is applied to an AND gate 316, the output Q of the flip-flop 314 is applied to an AND gate 317, and the output Q of the flip-flop 315 is applied to an AND gate 318. The other inputs of these AND gates 316, 317 and 318 are commonly connected to receive the time base signal obtained from a time base oscillator 312. Accordingly, the AND gate 316 provides the time base signal to the counter 319 during a time period when the output Q of the flip-flop 313 is the high level, i.e. after receipt of the azimuth associated information signal N until receipt of the azimuth scanning signal by the receiver 4. Similarly, the AND gate 317 provides the time base signal to the counter 320 during a time period when the output Q of the flip-flop 314 is the high level, i.e. after receipt of the azimuth associated information signal N until receipt of the azimuth scanning signal by the receiver 5. Similarly the AND gate 318 provides the time base signal to the counter 321 during a time period when the output Q of the flip-flop 315 is the high level, i.e. after receipt of the azimuth associated information signal N until receipt of the azimuth scanning signal by the unit 3. Accordingly, the counter 321 makes a counting operation of the time period t1 shown in FIG. 2 as described previously, the counter 319 makes a counting operation of the time period t2 as shown in FIG. 2, and the counter 320 makes a counting operation of the time period t3 as shown in FIG. 2. The data of the time period t2 as counted by the counter 319 is stored in a register 322. The data of the time period t3 as counted by the counter 320 is stored in a register 323. The data of the time period t1 as counted by the counter 321 is stored in a register 324.

On the other hand, the location data of the reference station 1 as error/parity checked by means of the error/parity check circuit 311 is stored in a location data register 326. A status register 325 is further provided, so that the register 325 is loaded with a ready/busy signal obtained from the serial/parallel converter 31 and a data error signal obtained from the check circuit 311. These registers 322 and 326 transfer the data to the data bus 32 responsive to addressing by the decode circuit 330.

The decode circuit 330 receives an addressing signal from the central processing unit 6 shown in FIG. 6 through an address bus 328. Accordingly, the decoder circuit 330 addresses or designates any one of the registers 322 to 326 responsive to the address data obtained from the central processing unit 6. The decoder circuit 330 further receives a control signal from the central processing unit 6 through a control bus 329. The decoder circuit 330 controls a loading, reading and other operations of the registers 322 to 326 responsive to the control signal. Thus, the data of the time periods t1, t2 and t3 and the location data of the reference station 1 are supplied from the receiving and control unit 3 shown in FIGS. 4 and 5 to the central processing unit.

The central processing unit 6 evaluates the current position and the moving direction of the aircraft 2 based on the time period data and the location data and based on the above described principle.

Figure 7A:
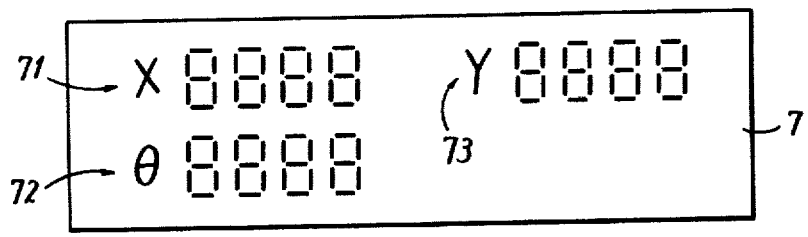
FIGS. 7A, 7B and 7C are diagrammatic views of different examples of the display for use in the present invention.
Figure 7B:
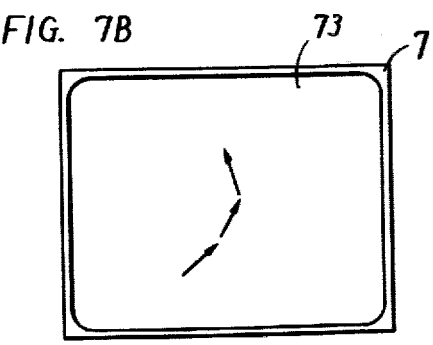
Figure 7C:
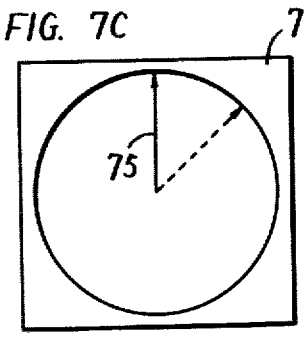

The current position and the moving direction of the aircraft 2 thus evaluated are displayed by the display 7 as shown in FIGS. 7A, 7B and 7C.

The display 7 shown in FIG. 7A comprises a digital display, which receives the data concerning the X axis (the latitude) and the Y axis (the longitude) and the azimuth ($\theta$) from the input/output interface circuit 61, thereby to display the same in a digital manner.

The display 7 shown in FIG. 7B comprises a typical cathode-ray-tube display, wherein the moving locus of the aircraft is displayed on the screen 74, whereby the current position and the moving direction is indicated.

The display 7 shown in FIG. 7C comprises a pointer 75, which is driven to indicate the direction of the movement of the aircraft by the direction of the pointer 75.

Alternatively, an XY recorder and the like may be used. Alternatively, the current position and/or the moving direction may be orally announced by using a sound synthesizing apparatus.

In the foregoing, the embodiment was described wherein the positions of the receiving portions on the aircraft were selected to be at the front end of the body, and at both ends of the planes. Alternatively, however, such positions of the receiving portions may be selected to be the front end, the central portion and the rear end of the body 201 (FIG. 4) of the aircraft. In case of the latter mentioned embodiment, by evaluating the straight line lying through these three positions on the body, the direction of the straight line formula proves to represent the moving direction of the aircraft and thus an arithmetic operation of the azimuth is much simplified.

Meanwhile, although in the above described embodiment, the gradients a1, a2 and a3 of the straight line formulas were evaluated based on the time periods t1, t2 and t3 after receipt of the azimuth associated information signal N until receipt of the azimuth scanning signal S by the respective receiver portions, alternatively the gradient a may be evaluated based on the phase difference rather than the time difference. More specifically, the reference station 1 may be structured such that the azimuth scanning signal is transmitted in successively different directions with successively different phases and the gradient a may be evaluated based on the phase differences between the azimuth scanning signal as received and the azimuth associated information signal N as received by the respective receiver portions.

Although the above described embodiment was described as employing a parabola type antenna for transmitting the scanning signal in a unidirectivity characteristic, alternatively a deflection control may be made in successively different directions by a magnetic and electric field, without employing such an antenna.

In the above described embodiments, the current position and/or the moving direction of the vehicle were evaluated by solving the above described simultaneous equations. In order to solve such simultaneous equations, however, a microcomputer of a relatively high speed computing capability is required. Therefore, another principle of the present invention that can provide a practically sufficient accuracy with a simpler scheme will be described in the following.

Figure 8A:
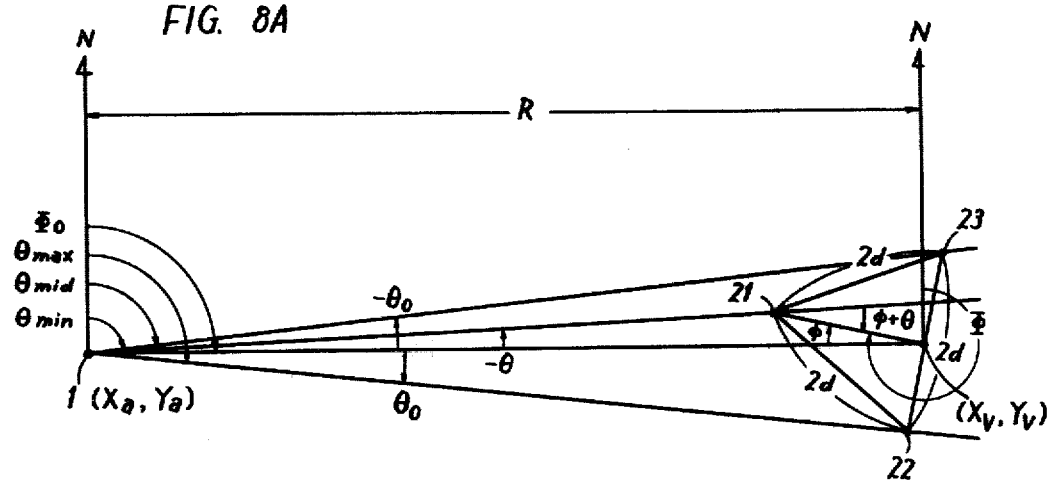
FIGS. 8A and 8B are graphs for explaining the principle of another embodiment of the present invention.
Figure 8B:
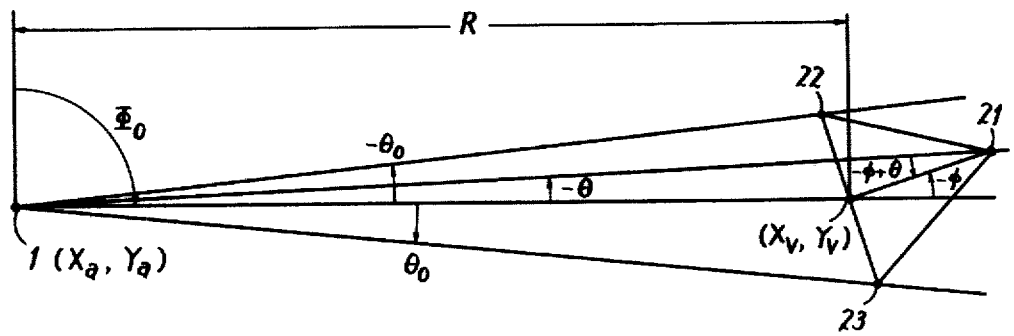

FIGS. 8A and 8B are graphs for explaining another principle of the present invention. Referring to FIGS. 8A and 8B, the reference numeral 1 denotes a reference station, and the reference numerals 21, 22 and 23 denote receiving positions. Let it be assumed that the angle of the respective straight lines connecting the respective receiving positions 21, 22 and 23 and the reference station 1 with respect to the reference azimuth of the north in $\theta$. Further let it be assumed that among the angles, the minimum is $\theta$ min and the maximum is $\theta$ max, while the intermediate angle is $\theta$ mid. However, if and when these angles $\theta1$, $\theta2$ and $\theta3$ are distributed with the angle of 0 radian ($=2\pi$ radian) falling therebetween, let it be further assumed that $2\pi$ is subtracted from the angle in the vicinity of $2\pi$ radian, so that the angles are distributed as a positive or negative angle both in the positive and negative vicinity of 0 radian, whereupon the angles $\theta$ min, $\theta$ mid, and $\theta$ max are determined. Thus, the correlation of $\theta1$, $\theta2$ and $\theta3$ with the angles $\theta$ min, $\theta$ mid and θ max may be classified into two types, as in the case as shown in FIG. 8A and in the case as shown in FIG. 8B. The full relation of θ1, θ2 and θ3 with θ min, θ mid and θ max is shown in Table I. More specifically, in the situation as shown in FIG. 8A, the cases as identified as 1, 2 and 3 occur and in the situation as shown in FIG. 8B, the cases as identified as 4, 5 and 6 occur.

TABLE I

| Case No. | Allotment | | | Illustration by Figures |
|---|---|---|---|---|
| | θmin | θmid | θmax | |
| 1 | θ1 | θ3 | θ2 | |
| 2 | θ3 | θ2 | θ1 | FIG. 8A |
| 3 | θ2 | θ1 | θ3 | |
| 4 | θ2 | θ3 | θ1 | |
| 5 | θ1 | θ2 | θ3 | FIG. 8B |
| 6 | θ3 | θ1 | θ2 | |

Meanwhile, the distances between the positions 21, 22 and 23 are assumed to be $d1=d2=d3=2d$, for simplicity.

The angle Φ0 shown in FIGS. 8A and 8B is defined by the following equation (16).

$$\Phi 0 = (\theta\text{min} + \theta\text{max})/2 \tag{16}$$

The angle Φ0 may be defined as an angle with respect to a straight line connecting the location of the reference station 1 and the center of the line connecting the position of the vehicle when the maximum angle θmax is received and the position of the vehicle when the minimum angle θmin is received.

Now let it be assumed that an intersection of the straight line representing the above described angle Φ0 and the straight line connecting the location of the vehicle where the minimum angle θmin is received and the position of the vehicle where the maximum angle θmax is received is the position (Xv, Yv) of the vehicle 2 and the distance from the position (Xv, Yv) of the vehicle to the location of the reference station 1 is R. Further let it be considered that the above described distance R is a straight line distance from the reference station 1 to the vehicle 2.

Furthermore, the angle θ0 shown in FIGS. 8A and 8B may be expressed by the following equation (17) and the angle θ shown in FIGS. 8A and 8B may be expressed by the following equation (18).

$$\theta 0 = (\theta\text{max} - \theta\text{min})/2 \tag{17}$$

$$\theta = \theta\text{mid} - \Phi 0 \tag{18}$$

Furthermore, it would be appreciated that as shown in FIGS. 8A and 8B the angle θ is defined as an angle of the straight line running from the center of the straight line between the position of the vehicle where the minimum angle θmin is received and the position of the vehicle where the maximum angle θmax is received to the position of the vehicle where the angle θmid is received with respect to the straight line representing the previously described angle Φ0. It is pointed out that the angle θ is defined under the convention in which the clockwise direction is a position direction. Accordingly, the angle θ is expressed by the following equation (19) in case of FIG. 8A and is expressed by the following equation (20) in case of FIG. 8B.

$$-\pi/6 + \theta 0 \leq \phi \leq \pi/6 - \theta 0 \tag{19}$$

$$-\pi/6 - \theta 0 \leq \phi \leq \pi/6 + \theta 0 \tag{20}$$

Now that the angles θmin, θmid, θmax, Φ0, φ, θ0, and θ shown in FIGS. 8A and 8B were defined as described in the foregoing, now an actual arithmetic operation will be described in the following. Now let it be assumed that the straight line distance R from the location of the reference station 1 to the position of the vehicle 2 is sufficiently large as compared with the distance 2d between the respective receiving positions. Accordingly, it is assumed that the angles θ and θ0 shown in FIGS. 8A and 8B and also shown in the above described equations (17) and (18) are sufficiently small.

Accordingly, in case of FIG. 8A the following equation (21) is obtained, while in case of FIG. 8B the following equation (22) is obtained.

$$R \sin(-\theta) \approx \sqrt{3}\, d \sin(\phi + \theta) \tag{21}$$

$$R \sin(-\theta) \approx \sqrt{3}\, d \sin(-\phi + \theta) \tag{22}$$

Furthermore, in case of FIG. 8A, the following equation (23) is obtained, while in case of FIG. 8B, the following equation (24) is obtained.

$$R \sin\theta 0 \approx d \cos(\phi + \theta) \tag{23}$$

$$R \sin\theta 0 \approx d \cos(-\phi + \theta) \tag{24}$$

Accordingly, by dividing the equation (21) by the equation (23) and by dividing the equation (22) by the equation (24), respectively, the angle θ for each of the cases shown in FIGS. 8A and 8B is obtained by the following equations (25) and (26), respectively.

$$\phi \approx \tan^{-1}\left(-\frac{1}{\sqrt{3}} \cdot \frac{\sin\theta}{\sin\theta 0}\right) - \tag{25}$$

$$\theta \approx \tan^{-1}\left(-\frac{1}{\sqrt{3}} \cdot \frac{\theta}{\theta 0}\right) - \theta$$

$$\phi \approx \tan^{-1}\left(\frac{1}{\sqrt{3}} \cdot \frac{\sin\theta}{\sin\theta 0}\right) + \tag{26}$$

$$\theta \approx \tan^{-1}\left(\frac{1}{\sqrt{3}} \cdot \frac{\theta}{\theta 0}\right) + \theta$$

Now using the angle φ expressed by the equations (25) and (26), the azimuth Φ of the vehicle 2 is evaluated. The azimuth Φ of the vehicle 2 may be evaluated in the manner shown in Table II for each of the cases 1 to 6 in terms of the previously depicted Table I.

TABLE II

| Case No. | How to Evaluate Φ |
|---|---|
| 1 | $\Phi = -\Phi 0 + \phi$ |
| 2 | $\Phi = -\Phi 0 + \phi + \frac{\pi}{3}$ |
| 3 | $\Phi = -\Phi 0 + \phi - \frac{\pi}{3}$ |
| 4 | $\Phi = \Phi 0 + \phi$ |
| 5 | $\Phi = \Phi 0 + \phi + \frac{\pi}{3}$ |
| 6 | $\Phi = \Phi 0 + \phi - \frac{\pi}{3}$ |

The current position (Xv, Yv) of the vehicle 2 may be expressed by the following equations (27) and (28).

$$Xv = Xa + R \sin\Phi 0 \tag{27}$$

$$Y_v = Y_a + R \cos\Phi 0 \tag{28}$$

wherein the straight line distance from the location of the reference station 1 to the position of the vehicle 2 is expressed by the equation (29) in case of FIG. 8A and is expressed by the equation (30) in case of FIG. 8B.

$$R = d \cos(\phi + \theta)/(\sin\theta 0) \tag{29}$$

$$R = d \cos(\phi - \theta)/(\sin\theta 0) \tag{30}$$

Figure 9:
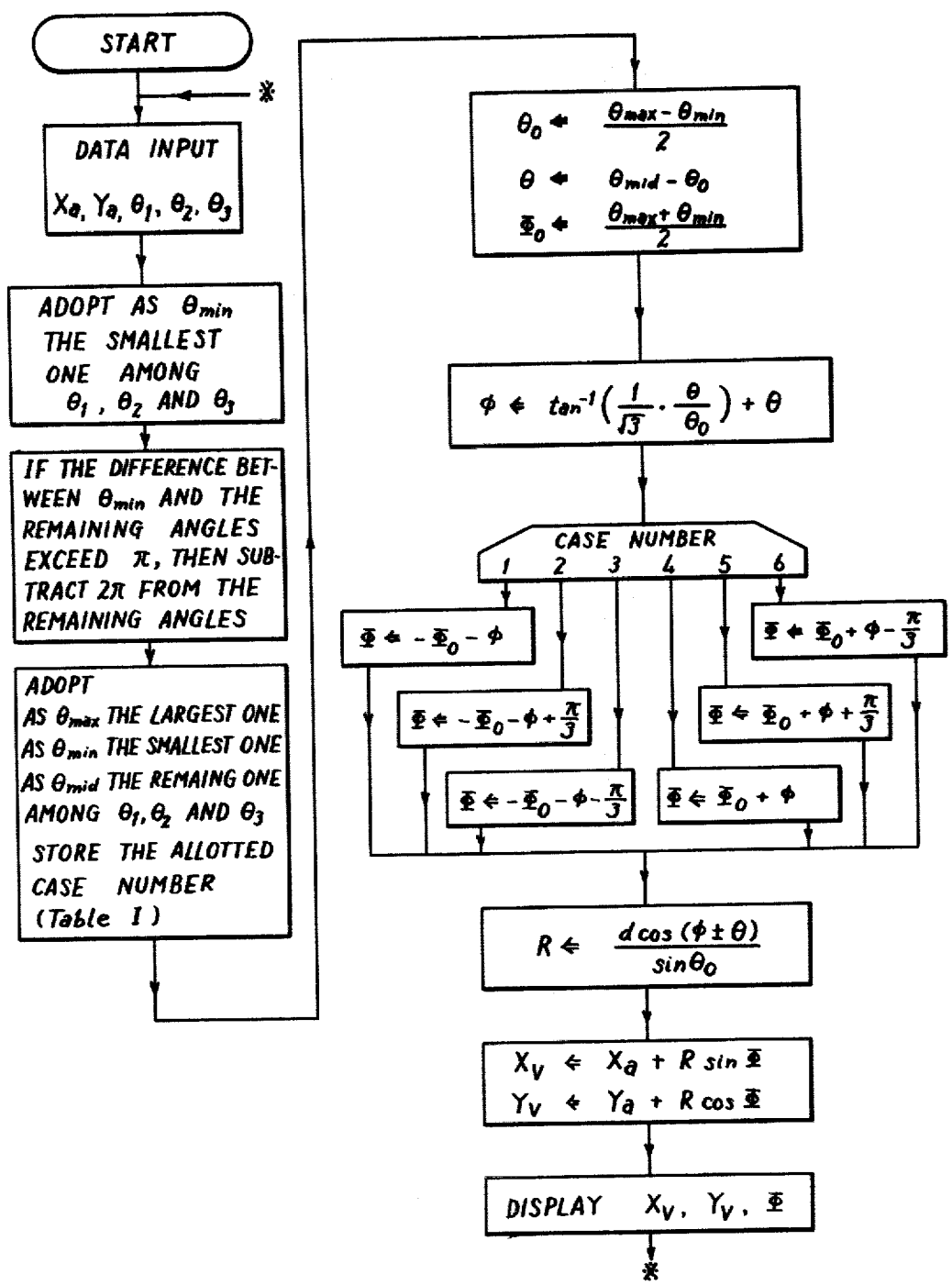
FIG. 9 is a flow chart for explanation of the embodiment shown in FIGS. 8A and 8B.

FIG. 9 is a flow diagram showing the steps of an arithmetic operation based on the above described simplified method. As is understood from the FIG. 9 flow diagram and the foregoing description, the simplified method contains a very simplified computation steps as compared with the previously described method for solving the simultaneous equations and thus enables a high speed computation. Thus, this approach enables employment of even a microcomputer of a relatively slow computation speed. Nevertheless, this approach achieves a necessary sufficient accuracy.

Figure 10:
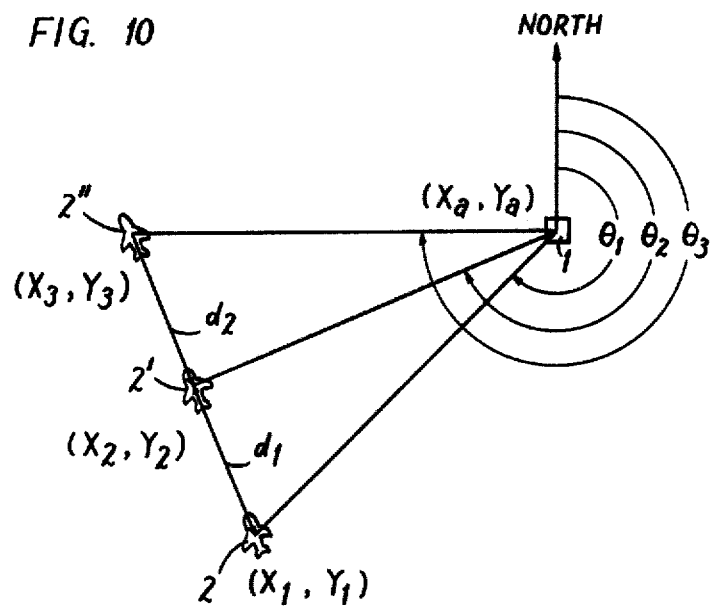
FIG. 10 is a view for explaining the principle of a further embodiment of the present invention.

FIG. 10 is a diagrammatic view for explanation of another principle of the present invention. In the embodiment shown, the vehicle is provided with only one receiving and control unit which may be the same as that shown in FIG. 5. According to the embodiment shown, three pieces of data are utilized that are obtained at three successively different positions 2, 2' and 2" of the vehicle when the vehicle moves in the service area of the reference station 1.

With respect to these successive positions 2, 2', and 2" of the vehicle, the time periods t1, t2, and t3 from receipt of the azimuth associated information signal N until receipt of the azimuth scanning signal S at the respective positions 2, 2', and 2", respectively, are evaluated. The previously described simultaneous equations (1) to (15) are thus solved, whereby the position data (X1, Y1), (X2, Y2), and (X3, Y3) of the vehicle at each of the positions 2, 2'and 2" is evaluated. The moving direction or azimuth of the vehicle 2 can be known by the gradient of the straight line connecting between the positions (X1, Y1) and X2, Y2), the graident of the straight line connecting between the positions (X2, Y2) and (X3, Y3) and the like.

As understood from the above described embodiment, the vehicle 2 may be provided with only at least one receiving and control unit.

Figure 11:
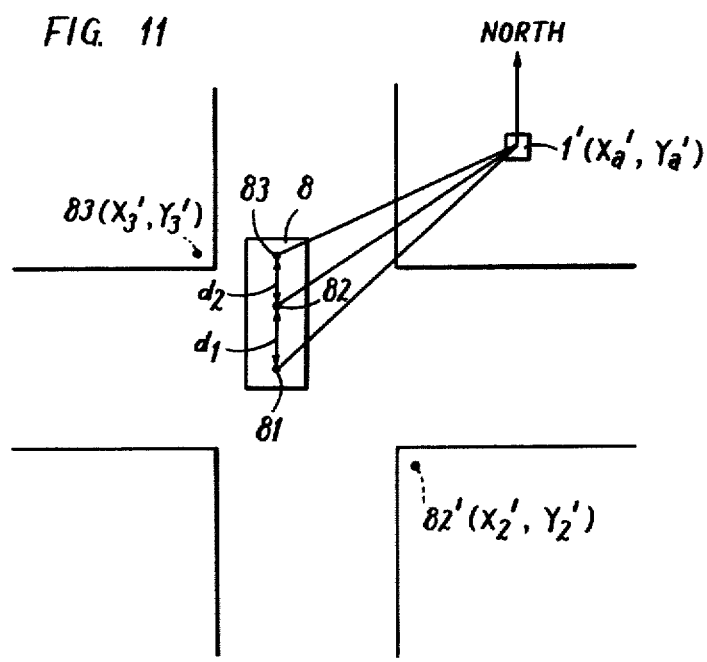
FIG. 11 is a view for explaining the principle of still a further embodiment of the present invention.

FIG. 11 is a diagrammatic view for explanation of a further embodiment of the present invention. The FIG. 11 embodiment employs, as a vehicle, an automobile 8 which moves on the road. The reference station 1' is provided in the vicinity of an intersection, for example. Such receivers as shown in FIG. 5 are provided at the positions 81, 82, and 83 of the automobile 8.

Alternatively, the FIG. 11 embodiment may be structured such that a receiving and control unit 3 is provided only at one position 81 of the automobile 8, while fixed receiving stations are provided at the locations 82' and 83' in the vicinity of the intersection, so that the data as received by the fixed receiving stations is received by the receiving and control unit borne on the automobile 8 at the postion 81 to obtain the above described time periods t1, t2 and t3. In this case, since the position 82 (X2', Y2',) and the position 83' (X3', Y3') are known quantities, the arithmetic operation steps can be more simplified.

Meanwhile, the above described approach, wherein only one receiving and control unit is provided on the vehicle while the fixed receiving stations are separately provided and the data concerning the time is transmitted from the fixed receiving stations to the receiving and control unit borne on the vehicle, whereby the current position of the vehicle is evaluated, can be equally applied to any types of vehicles such as an aircraft, ship and the like other than an automobile, as is needless to say. It is further pointed out that by way of a modification of the above described embodiment only one fixed receiving station may be provided, while a receiver and a receiving and control unit may be provided on the vehicle.

Figure 12A:
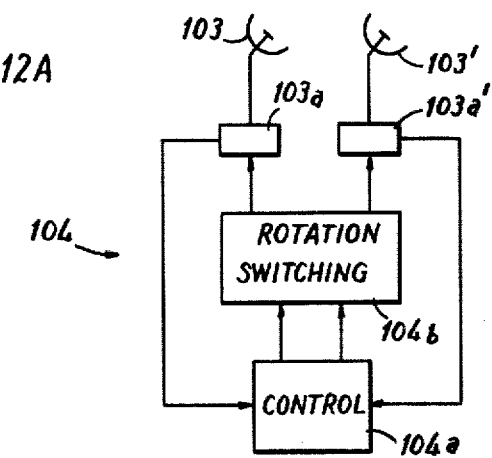
FIG. 12A is a block diagram showing another example of the transmitter for use in the present invention.
Figure 12B:
FIG. 12B is a graph showing one example of the azimuth scanning signal being transmitted by the FIG. 12A transmitter.

FIGS. 12A and 12B are views for explaining still a further embodiment of the present invention. In the embodiment shown, two unidirectional directivity antennas 103 and 103' are employed in order to transmit the azimuth scanning signal. A rotational driving circuit 104 is provided with a rotational direction switching circuit 104b. The rotational direction switching circuit 104b is aimed to control rotating means 103a and 103a' for antennas 103 and 103', respectively. The rotating means 103a and 103a' are structured to provide a signal representing that the antennas 103 and 103' are directed to a predetermined azimuth such as the north at such timing. The north representing signals are applied to the control circuit 104a. The control circuit 104a is structured such that, if and when one antenna 103 is rotated by one rotation from the predetermined azimuth such as the north to be again directed to the north, for example, the control circuit 104a switches the other antenna 103' to be rotated contrary to the rotating direction of the above described antenna 103. Accordingly, the antennas 103 and 103'transmit the azimuth scanning signal S of one cycle, as shown in FIG. 12B. The azimuth scanning signal S is transmitted from the antenna 103, while the azimuth scanning signal S'is transmitted from the antenna 103' which rotates in the reverse direction. The azimuth scanning signal S in the following cycle is transmitted at a predetermined time separation from the azimuth scanning signal S' of the preceding cycle. More specifically, in the FIG. 12A embodiment, it follows that the azimuth scanning signals S and S' are transmitted alternately and intermittently for each cycle. As to be described subsequently, in determining the azimuth, such determination is necessarily made by a combination of the azimuth scanning signals S and S', thereby to avoid such determination based on the preceding scanning signal S' and the current scanning signal S.

Figure 13:
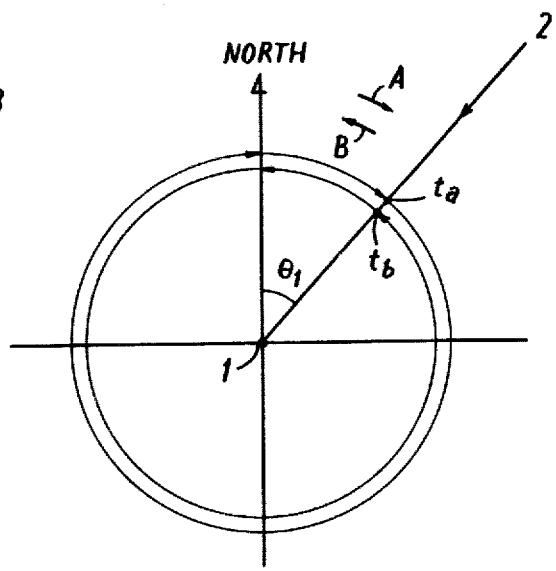
FIG. 13 is a graph showing one example for evaluating the angle by the azimuth scanning signal shown in FIG. 12B.

According to the embodiment shown in FIGS. 12A and 12B, the angle $\theta 1$ (and $\theta 2$ and $\theta 3$) is known in the manner depicted in FIG. 13, for example. More specifically, let it be assumed that the azimuth scanning signal is scanned in the arrow A direction by means of the antenna 103, for example, from the reference station 1, whereupon the azimuth scanning signal is scanned in the arrow B direction by means of the antenna 103' from the reference station 1. In such a situation, the vehicle 2 receives the azimuth scanning signal at the timing ta and then receives the azimuth scanning signal at the timing tb. Accordingly, the vehicle 2 can determine the angle $\theta 1$ (and $\theta 2$ and $\theta 3$) based on the time period from the timing ta when the first scanning signal S is received to the timing tb when the scanning signal S' is received. According to the embodiments depicted in conjunction with FIGS. 12A, 12B and 13, the azimuth signal circuit portion 105 (FIG. 3A) required in the above described embodiment can be dispensed with. More specifically, since the embodiment has been adapted such that the azimuth scanning signal is reversed for each cycle, it follows that the reversing timing represents the particular azimuth such as the north, which means that the azimuth scanning signal per se contains the information concerning the predetermined azimuth such as the north.

It is pointed out that light, sound wave, ultrasonic wave and the like can be equally employed, apart from electric wave, for the purpose of transmission of the signals, in practicing the present invention. In employing light, it is preferred to utilize a very sharp light beam and in this context a laser beam can be advantageously utilized. When a sound wave or ultrasonic wave is employed, the current position and the moving direction of a vehicle moving in the air, on the ground, in the water or under the sea can be measured.

In case where a vehicle is an aircraft, the movement of the aircraft can be measured in terms of three dimensions by employing the data of various aircraft measuring equipment such as an altimeter.

If a vehicle is of a type which can assume a variably inclined attitude with respect to the ground, such as an airplane, it is necessary to correct the coordinate data in accordance with the inclination of the vehicle. If a vehicle is of a type that can assume a varying height or depth from the reference level, it is also necessary to correct the coordinate data. For example, considering an airplane flying at the height h with the direct distance between the reference station and the airplane being l, then it is necessary to evaluate the horizontal distance lhr between the reference station and the airplane as the coordinate data. To that end, the formula $lhr = \sqrt{l^2 - h^2}$ may be operated by the use of a microprocessor. In the case of an airplane wherein three receiving stations are disposed along a straight line in the airplane, similar correction is required in accordance with the pitching angle of the airplane.

Although in the foregoing embodiments the linear equations were utilized, any other equations such as those for hyperbola can be utilized for the purpose of the present invention. It is further pointed out that in indicating the current position of a vehicle, not only an ordinate representation as shown in FIG. 7A but also a polar representation may be utilized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system for measuring the current position and/or the moving direction of a moving vehicle, comprising:
   transmitting means installed at a reference location, said transmitting means comprising
     first transmitting means for transmitting an azimuth scanning signal being scanned in succession in different directions,
     second transmitting means for transmitting a location information signal representing said reference location of said transmitting means, and
     third transmitting means for transmitting an azimuth associated information signal containing information concerning a predetermined azimuth,
   receiving means for receiving said azimuth, scanning signals at three positions spaced apart from each other by predetermined distances and for receiving said location information signal and said azimuth associated information signal at at least one of said three positions, and
   information processing means borne on said moving vehicle, said information processing means being structured to evaluate at least one of the current position and the moving direction of said moving vehicle based on the information concerning the respective time periods from receipt of said azimuth associated information signal until receipt of said azimuth scanning signal at said three positions, said location information and the information concerning said predetermined distances between said three positions.

2. A system in accordance with claim 1, wherein said receiving means comprises three receiving portions installed at said three positions spaced apart from each other by said predetermined distances.

3. A system in accordance with claim 2, wherein said vehicle comprises a single vehicle, and said three receiving portions of said receiving means for receiving the signals from said transmitting means are all installed in said single vehicle, as spaced apart from each other by said predetermined distances.

4. A system in accordance with claim 2, wherein said vehicle comprises a single vehicle, and wherein of said three receiving portions of said receiving means for receiving the signals from said transmitting means at least two receiving portions are provided in said single vehicle while the remaining receiving portion is installed at a predetermined fixed location.

5. A system in accordance with claim 1, wherein said vehicle comprises a single vehicle, and wherein said three positions include successive positions which are changeable in association with the movement of said vehicle.

6. A system in accordance with claim 2, wherein said vehicle comprises two vehicles, and wherein of said three receiving portions of said receiving means one receiving portion is installed on one vehicle, while the remaining two receiving portions are installed on the other vehicle.

7. A system in accordance with any one of the preceding claims, wherein said transmitting means is adapted to transmit said signals by way of an electromagnetic wave, and wherein said receiving means is structured to receive said electromagnetic wave signals.

8. A system in accordance with claim 7, wherein said electromagnetic wave is an electric wave.

9. A system in accordance with claim 7, wherein said electromagnetic wave is light.

10. A system in accordance with claim 9, wherein said light is laser light.

11. A system in accordance with any one of claims 1 to 6, wherein said transmitting means is structured to transmit the respective signals by way of a sound wave or ultrasonic wave, and wherein said receiving means is structured to receive said sound wave signals or the ultrasonic wave signals.

12. A system in accordance with any one of the preceding claims, which further comprises display means operatively coupled to said information processing means for displaying at least one of the current position and the moving direction of said moving vehicle.

13. A system in accordance with claim 12, wherein said display means comprises digital display means.

14. A system in accordance with claim 12, wherein said display means comprises a cathode ray tube.

15. A system in accordance with any one of the preceding claims, wherein said first transmitting means is structured to transmit said azimuth scanning signal in successively different directions in different phases, whereby the information concerning said time periods is determined based on the phase differences of the azimuth scanning signals as received at said three positions.

16. A system in accordance with any one of the preceding claims, wherein said third transmitting means is included in said first transmitting means, said first transmitting means is adapted such that said azimuth scanning signal is reversed each time said azimuth scanning signal is directed to said specified azimuth, whereby said information concerning said specified azimuth is contained in said azimuth scanning signal.

17. A system in accordance with claim 16, wherein said first transmitting means is adapted to intermittently transmit said scanning signal with a predetermined time difference for each cycle, whereby superposition between a preceding one cycle signal and a succeeding one cycle signal of said azimuth scanning signal is eliminated.

18. A system in accordance with any one of the preceding claims, wherein said information processing means is adapted to execute the steps of
    evaluating a first plurality formulas representing a plurality of lines connecting said three positions and said fixed location where said transmitting means is installed,
    evaluating a second plurality of formulas representing a plurality of lines connecting said respective positions, and
    evaluating said three positions by solving said first and second formulas.

19. A system in accordance with claim 18, wherein said first plurality of formulas and said second plurality of formulas contain linear equations.

20. A system in accordance with claim 19, wherein said information processing means is adapted to execute the steps of
    evaluating an angle of said respective positions with respect to said fixed location where said transmitting means is installed, based on said information concerning the time periods and said location information, and
    evaluating the gradients of said first plurality of formulas in terms of the tangents of said evaluated angles.

21. A system in accordance with claim 18, wherein said information processing means is adapted to evaluate said moving direction based on said respective positions.

22. A system in accordance with any one of claims 1 to 17, wherein said information processing means is adapted to execute the steps of
    evaluating the angles of said respective positions with respect to said fixed location where said transmitting means is installed based on said information concerning the time periods and said location information,
    evaluating the angles of the position of said vehicle with respect to said fixed location based on the maximum and the minimum among said evaluated angles,
    evaluating a straight line distance from said vehicle to said fixed location based on the position corresponding to said maximum angle and the position corresponding to said minimum angle, and
    evaluating the current position of said vehicle based on the angle of said vehicle with respect to said fixed location and said straight line distance.

* * * * *